Nov. 22, 1960   B. WEIRAUCH   2,961,095
DEVICE FOR SORTING ARTICLES BY LENGTH, PARTICULARLY
FOR SORTING CUCUMBERS, BEANS, OR THE LIKE
Filed Oct. 7, 1955   5 Sheets-Sheet 2
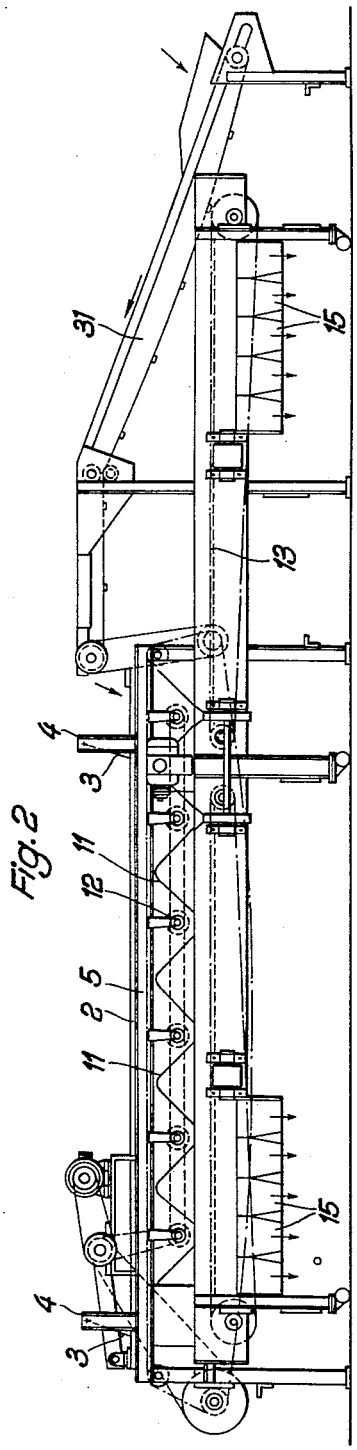
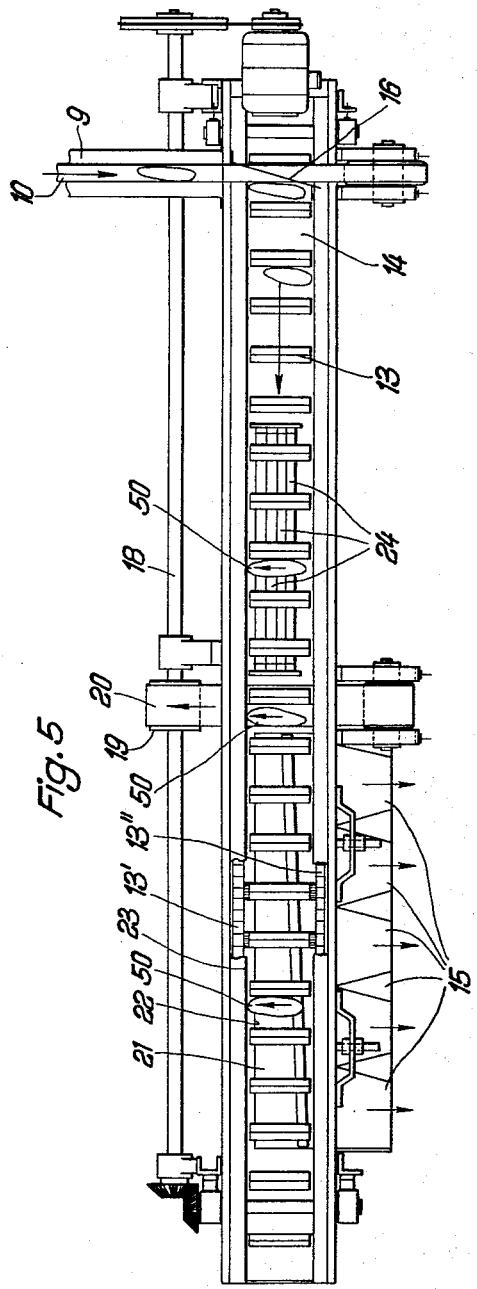

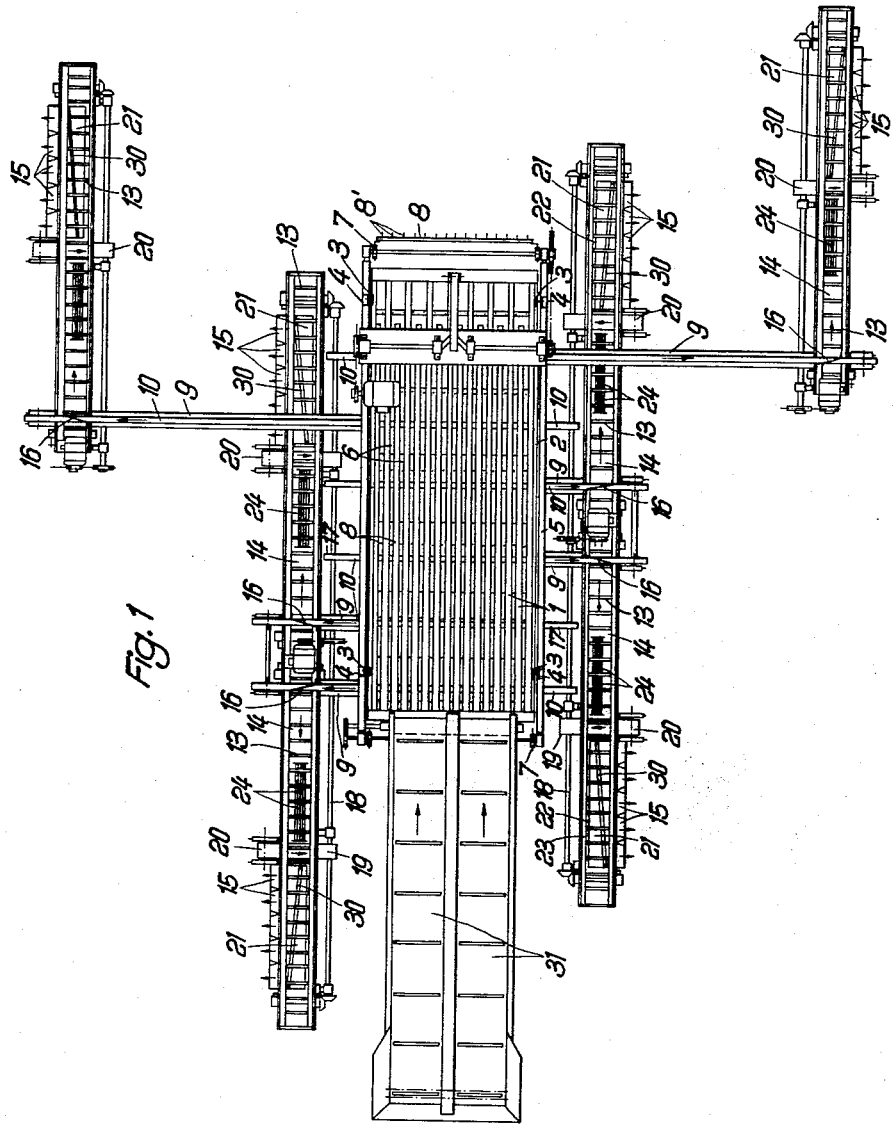

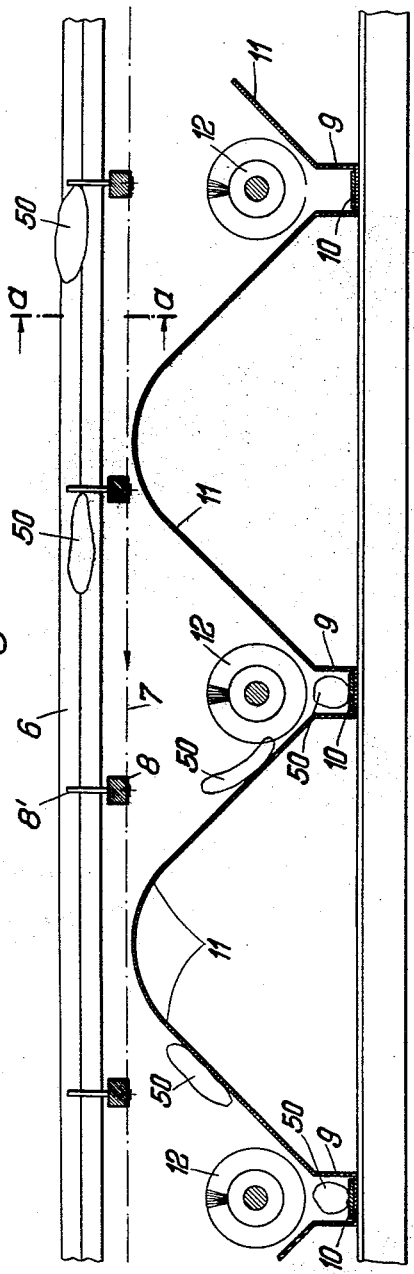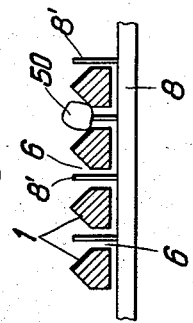

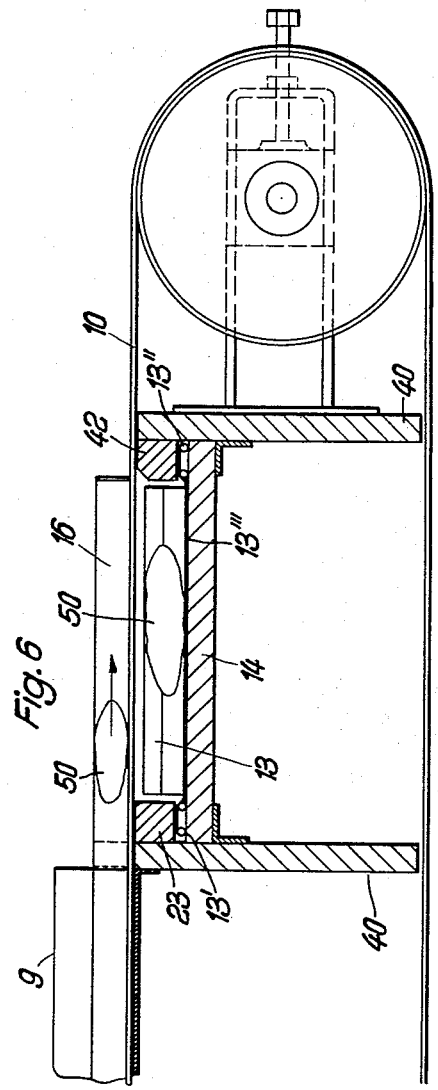
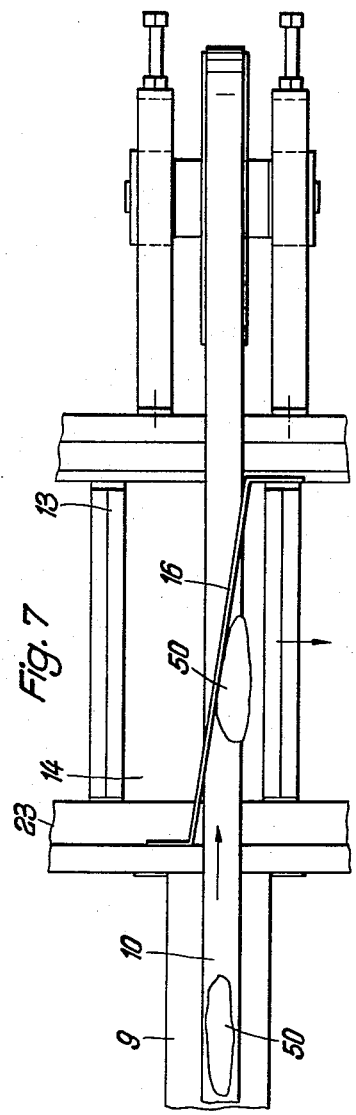

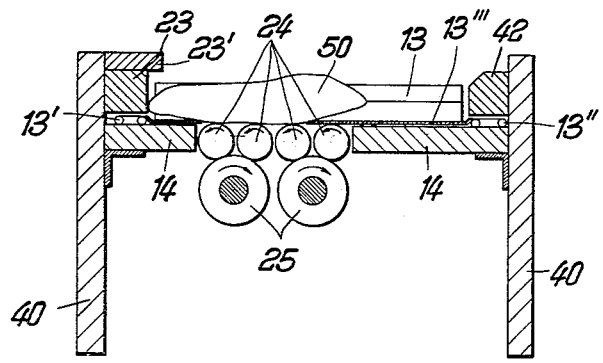
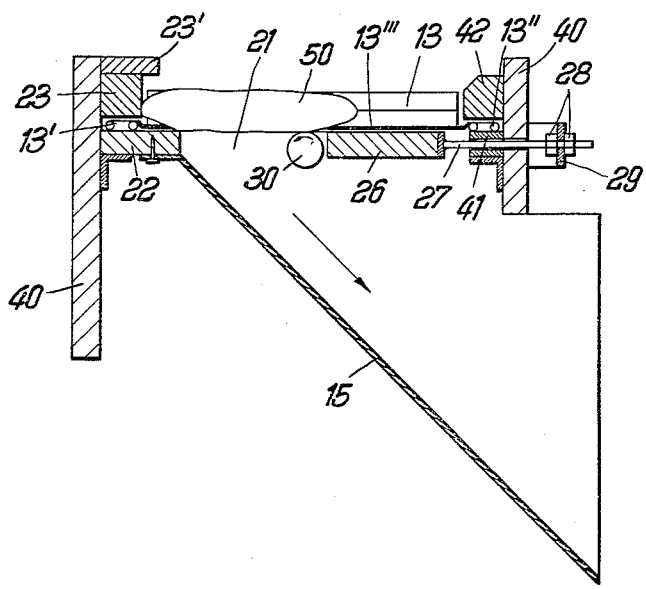

United States Patent Office 2,961,095
Patented Nov. 22, 1960

2,961,095

DEVICE FOR SORTING ARTICLES BY LENGTH, PARTICULARLY FOR SORTING CUCUMBERS, BEANS, OR THE LIKE

Bruno Weirauch, Braunschweig, Germany, assignor to Maschinenfabrik August Herbort, Braunschweig, Germany Filed Oct. 7, 1955, Ser. No. 539,247

Claims priority, application France May 11, 1955

6 Claims. (Cl. 209—75)

This invention relates to a device for sorting articles, and more particularly, cucumbers, according to their length.

It is an object of the present invention to provide a device which operates automatically to receive cucumbers or articles frrom a supply thereof and to feed them to different places according to their length.

Another object of the invention is to provide a plant adapted to sort oblong articles both according to their length and according to their thickness.

With these and other objects in view, a device according to the present invention comprises a conveying element which successively leads cucumbers or the like to be sorted according to length over a sorting slot while lying transversely of the conveying direction, the sorting slot progressively widening in the conveying direction from an abutment edge and a transverse conveyor being provided in front thereof for axially moving the cucumbers or the like so as to have one of their ends against the abutment.

It is preferable for the conveying element leading over the sorting slot to be constructed as an endless ribbed belt, formed of a pair of parallel strips connected by spaced crossbars so as to provide receiving openings between the preferably inverted V section, spaced ribs disposed transversely of the conveying direction, said belt running between the loading position for the cucumbers and the sorting slot with an upper conveying run on a base member.

It has proved to be practicable for the transverse conveyor to consist of a simple conveyor belt with a roughened surface, which runs under the upper conveying run of the conveying element leading to the sorting slot.

It is advantageous to arrange moving rollers in the base member supporting the endless ribbed belt, and hence in the conveying direction in front of the transverse conveyor, which rotate towards the abutment edge and bring the cucumbers or the like, before reaching the conveyor belt, up to or close to the abutment edge. The cucumbers or the like are thus properly disposed against the edge before they are led over the sorting slot.

It is also suitable to arrange a contactor roller at one edge of the sorting slot and extending over its whole length, preferably at an inclined edge thereof, which rotates towards the abutment edge and holds the material to be sorted safely against the abutment edge while passing over the sorting slot, so that an exact sorting by length is ensured.

The moving rollers and the contactor roller can have individual driving means. They can also be driven more simply by frictional contact with the conveyor belt.

The adjustment range of the new sorting device can be simply chosen or set by one and preferably the inclined or stepped longitudinal slot edge being movable and adjustable in the transverse direction.

In order to prevent slightly curved cucumbers or the like, for example, from rising when they contact the abutment edge in their transverse movement, it is advisable for the abutment edge for one end of the cucumbers or the like to be covered over at least at the contact position.

The new machine can be constructed for universal operation, particularly for insertion in overall driving means, in that several conveying elements intended for cucumbers of different thicknesses and each leading to its own sorting slot are arranged on either side of a known sorting device for classifying the cucumbers or the like according to thickness, which leads the cucumbers or the like of the relevant thickness and of various lengths to each conveying element.

It is of advantage if the device for sorting the cucumbers or the like according to thickness consists of several upwardly open and axially pivotable guide channels each with a receiving slot in the base which widens in the conveying direction, through which channels advancing means run successively.

Ropes can be used for the same purpose which run in pairs over pulleys, the pairs of ropes carrying the cucumbers or the like successively towards the outlet from the machine.

Other and further objects, features and advantages of the invention will be pointed out hereinafter and appear in the appended claims forming part of the application.

In the accompanying drawings a now preferred embodiment of the invention is shown by way of illustration and not by way of limitation.

Fig. 1 is a plan view of a sorting machine consisting of devices for sorting by thickness and by length, Fig. 2 is a side view thereof, Figs. 3 and 4 show details of the device for sorting by thickness, Fig. 5 is a plan view of a device for sorting by length, Figs. 6 and 7 show details of guiding means of the device for sorting by thickness and the device for sorting by length in section and plan view, Fig. 8 shows in cross-section a contactor device for the material to be sorted at a measuring edge, and Fig. 9 is a cross-section through the sorting slot of the device for sorting by length.

Similar reference numerals denote similar parts in the different views.

Referring now to the drawings in greater detail, it will be seen that a frame 2, divided into a number of guide channels and formed by a number of ribs 1, Fig. 1, of inverted V section, is suspended so as to be pivotable in its longitudinal direction by pendulum rods 3 from supports 4, Fig. 2, of a machine frame 5. Between each two ribs 1, a long receiving slot 6 is provided which broadens gradually or in steps from its one end serving for receiving the cucumbers or the like 50 to be sorted to its other end. Under the pivotal frame 2 run two endless chains 7, Figs. 3 and 4, which carry rakes 8 between them, whose prongs 8' engage in the receiving slots 6 and are guided along in them. Conveyor channels 9 are also provided under the pivotal frame 2 running transversely to its pivotal direction, in which is guided one run of an endless conveyor belt 10. Each two adjacent channels 9 are connected together by a saddle shaped guiding member 11, Figs. 2 and 3, extending over the whole width of the pivotal frame 2. A driven brush roller 12 is mounted over each conveyor channel 9 and its bristles are arranged in helical lines on the surface of the roller. Each conveyor belt 10 is guided towards an associated ribbed or crossbar belt 13, Figs. 1 and 5. These crossbar belts 13 are arranged in the machine frame on either side of the pivotal frame 2 and parallel to its pivoting direction. Each belt 13 consists of two parallel strips 13', 13'' connected at regular intervals by crossbars 13 of inverted V section, secured to transverse straps 13''' of the strips 13', 13'', thus forming a ladder, and passes over a base member 14 to a number of receiving shafts 15 arranged side-by-side at the end remote from supply.

Where the upper runs of the conveyor belts 10 cross the associated crossbar belts 13, baffle plates 16, Figs. 6 and 7, for the material to be sorted are provided closely above the upper run and obliquely to the conveying direction.

Guiding rollers 17 for the conveyor belts 10 are driven by shafts 18 which are mounted on either side of the pivotal frame 2. On these shafts are also mounted driving wheels 19 for an endless transverse conveyor belt 20 arranged at the middle of each ribbed belt 13.

Above their receiving shafts 15, the crossbar belts 13 run over a sorting slot 21 gradually or sectionally widening in the conveying direction, and defined by base strips 22 and 26. The lateral strips 13', 13" of the crossbar belts are guided in recesses formed between the side walls 40 of the frame, the base members 14 or 22 and 41, and the top members 23 and 42. The top member 23 simultaneously forms the abutment for endwise engagement of the cucumbers or the like and is covered over at 23', as shown, to prevent the cucumbers from slipping over the edge.

Several rollers 24, Figs. 1, 5 and 8, lying with their axes parallel to the conveying direction are provided in the base member 14 of each crossbar belt 13 in front of the transverse conveyor belt 20, which can be set in rotation by two friction rollers 25 so that they move the material to be sorted, as it is guided over the base member 14, towards the abutment strip 23.

The edge 26 of each sorting slot 21 arranged obliquely to the conveying direction is adjustably mounted, by means of rods 27, Fig. 9, at its rearward longitudinal edge, transversely of one side wall of the conveyor belt 13. The rods 27 have threads on their free ends so that they can be moved by means of adjusting nuts 28 in a stirrup 29 on the side wall to adjust and set the slot 21.

A contactor roller 30 is mounted at and lying parallel to the edge 26 and one end of the roller 30 is guided beneath the upper run of the transverse conveyor belt 20 and is driven by it during rotation thereof.

The width of the receiving slot 21 for each crossbar belt is determined by the various lengths of the cucumbers or the like previously sorted according to thickness.

The operation is as follows:

The cucumbers or the like 50 to be sorted are fed on to an inclined conveyor 31, Figs. 1 and 2, and are led by this to the end of the pivotal frame 2 where the receiving slots 6 are smallest. They are directed longitudinally by the inverted V shaped ribs 1 and are conveyed by the prongs 8' in the direction of their longitudinal axes over the receiving slots 6, until they arrive at a slot width corresponding to their thickness.

They then fall, sorted according to thickness, on to the saddle-shaped guiding members 11 and are turned by these through 90° to their longitudinal direction and then pass, supported by the action of the brush rollers 12, to the upper run of an associated endless conveyor belt 10 at the base of the channel 9 formed by the guide members 11. They are brought from there by the baffle plate 16 to an associated crossbar belt 13 and are conveyed between the crossbars of this belt transversely to their longitudinal direction. The material to be sorted thus reaches the shifting rollers 24 in the base member 14 of the crossbar belt 13 which bring the material with one end up to or close to the abutment strip 23.

Satisfactory endwise contact of the cucumbers or other articles 50 with this strip 23 is established during their passage over the conveyor belt 20.

The crossbars 13 now move the cucumbers or the like 50 further over the sorting slot 21 succeeding the belt 20 in the conveying direction of belt 13. During the passage they are constantly held in endwise contact with the abutment strip 23, Fig. 9, by the contactor roller 30 so as to reach the slot width corresponding to their length for achieving a very exact sorting by length. The cucumbers or the like 50 thus cannot be removed from the abutment rib 23, because of their shape, while rolling over the sorting slot 21, whereby an inaccurate sorting would be made.

The cucumbers or the like, after falling through the slot 21 at the position corresponding to their length, are received in the corresponding receiving shaft 15.

The abutment edge 23 of each crossbar belt is covered over at 23' to prevent the material being thrown out due to impulses imparted to it by the shifting rollers 24 or the conveyor belt 20.

The machine shown in Figure 1 has six conveyor belts 10 beneath the pivotal frame 2 which leads the crossbar belts 13, three of which are arranged on each side of the machine for sorting by thickness. Five receiving shafts 15 are provided under each sorting slot 21, so that with the new machine a total of thirty different assorted sizes can be obtained with the greatest accuracy both according to thickness and according to length.

While the invention has been described in detail with respect to a certain now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. A device for sorting articles by length, particularly for sorting cucumbers, beans, or the like, comprising a frame including an abutment edge extending along the frame and a base member which forms a sorting slot widening in the longitudinal extension of the abutment edge, means for conveying the articles over the sorting slot from the narrower to the wider end thereof in such a way that the articles are permitted to fall through the slot at the point corresponding to their length, means for feeding the articles to the conveyor means in a transverse position of the conveying direction, said conveyor means including means disposed for holding the articles in said transverse position during the conveying, and a contactor roller mounted for rotation in one of the edges of the slot, so as to extend over the whole length thereof, and adapted to rotate in a direction to ensure endwise engagement of each of the articles with the abutment.

2. A device for sorting articles by length, particularly for sorting cucumbers, beans, or the like, comprising a frame including an abutment edge extending along the frame and a base member which forms a sorting slot widening in the longitudnal extension of the abutment edge, means for conveying the articles over the sorting slot from the narrower to the wider end thereof in such a way that the articles are permitted to fall through the slot at the point corresponding to their length, means for feeding the articles to the conveyer means in a transverse position of the conveying direction, said conveyer means including means disposed for holding the articles in said transverse position during the conveying, and a contactor roller mounted for rotation in the edge of the slot opposed to the abutment, so as to extend over the whole length thereof, and adapted to rotate in a direction to ensure endwise engagement of each of the articles with the abutment.

3. A device for sorting articles by length, particularly for sorting cucumbers, beans or the like, comprising a frame including an abutment edge extending along the frame and a base member which forms a sorting slot widening in the longitudinal extension of the abutment edge, means for conveying the articles over the sorting slot from the narrower to the wider end thereof in such a way that the articles are permitted to fall through the slot at the point corresponding to their length, means for feeding the articles to the conveyer means in a transverse position of the conveying direction, said conveyer means including means disposed for holding the articles in said transverse position during the conveying, and means for axially moving the articles in a direction to ensure endwise engagement of each of the articles with the abutment, said last mentioned means including a transverse conveyer belt arranged before the sorting slot, shifting rollers arranged in the base member with their axes in the conveying direction of the first conveyer means, and a contactor roller mounted for rotation in one of the edges of the slot, so as to extend over the whole length thereof, said transverse conveyer belt, said shifting rollers and said contactor roller being adapted to rotate in a direction to ensure endwise engagement of each of the articles with the abutment, and said shifting and contactor rollers being frictionally driven by the transverse conveyer.

4. In combination with a sorting device adapted to classify oblong articles and particularly cucumbers according to thickness and having outlets at which articles of selected thicknesses are removed from said device, several further devices for sorting the articles additionally by length, said further devices being arranged on either side of the first sorting device, each of the further sorting devices being provided with means operatively connected to one of said outlets of the first sorting device, each of the further sorting devices comprising a frame including an abutment edge extending along the frame and a base member which forms a sorting slot widening in the longitudinal extension of the abutment edge, means for conveying the articles over the sorting slot from the narrower to the wider end thereof in such a way that the articles are permitted to fall through the slot at the point corresponding to their length, means for feeding the articles to the conveyer means in a transverse position of the conveying direction, said conveyer means including means disposed for holding the articles in said transverse position during the conveying, and means for axially moving the articles in a direction to ensure endwise engagement of each of the articles with the abutment.

5. In a plant for sorting oblong articles by thickness and length, in combination, a device for sorting the articles according to thickness, said device comprising a pivotal frame with receiving slots, and, beneath the device, collecting channels lying transversely of the conveying direction with guide members, a plurality of other devices for sorting the articles additionally by length, said other devices being arranged on either side of the first sorting device, each of the other sorting devices comprising a frame including an abutment edge extending along the frame and a base member which forms a sorting slot widening in the longitudinal extension of the abutment edge, conveyer means comprising a pair of lateral endless strips and crossbars connecting said strips and adapted to run with their upper conveying run upon said base member for leading the articles over the sorting slot from the narrower to the wider end thereof in such a way that the articles are permitted to fall through the slot at the point corresponding to their length, means comprising endless conveyer belts for feeding the articles to the crossbar conveyer means in a transverse position of the conveying direction, said crossbars being disposed for holding the articles in said transverse position during the conveying, and means for axially moving the articles in a direction to ensure endwise engagement of each of the articles with the abutment, said endless conveyer belts leading transversely over the crossbar conveyer means and article feeding means having stripping means at this point for guiding the articles on to the respective crossbar conveyer means.

6. In a plant for sorting oblong articles by thickness and length, in combination, a device for sorting the articles according to thickness, said device comprising a pivotal frame with receiving slots, and, beneath the device, collecting channels lying transversely of the conveying direction with guide members and endless conveyer belts running on the bottom of the guide members, and brush rollers with their bristles arranged in helical lines provided above the collecting channels and between their guide members, for feeding the articles a plurality of further devices for sorting the articles additionally by length, said further devices being arranged on either side of the first sorting device, each of the further sorting devices comprising a frame including an abutment edge extending along the frame and a base member which forms a sorting slot widening in the longitudinal extension of the abutment edge, conveyer means comprising a pair of lateral endless strips and crossbars connecting said strips and adapted to run with their upper conveying run upon said base member for leading the articles over the sorting slot from the narrower to the wider end thereof in such a way that the articles are permitted to fall through the slot at the point corresponding to their length, means comprising said endless conveyer belts for feeding the articles to the crossbar conveyer means in a transverse position of the conveying direction, said crossbars being disposed for holding the articles in said transverse position during the conveying, and means for axially moving the articles in a direction to ensure endwise engagement of each of the articles with the abutment, said endless conveyer belts leading transversely over the crossbar conveyer means and said article feeding means having stripping means at this point for guiding the articles on to the respective crossbar conveyer means.

References Cited in the file of this patent

UNITED STATES PATENTS

| Number | Name | Date |
|---|---|---|
| 932,749 | Barnett | Aug. 31, 1909 |
| 1,245,584 | Hallock | Nov. 6, 1917 |
| 1,305,900 | Harnish | June 3, 1919 |
| 1,333,858 | Low et al. | Mar. 16, 1920 |
| 1,466,909 | Leaver et al. | Sept. 4, 1923 |
| 2,755,929 | Prenveille | July 24, 1956 |
| 2,782,922 | Bertinot | Feb. 26, 1957 |
| 2,813,627 | Steber | Nov. 19, 1957 |